US006550349B1

(12) United States Patent
Godin

(10) Patent No.: US 6,550,349 B1
(45) Date of Patent: Apr. 22, 2003

(54) PIPETTE TIP HOLDER

(75) Inventor: Charles Nobert Godin, Palo Alto, CA (US)

(73) Assignee: Molecular Devices Corporation, Sunnyvale, CA (US)

( * ) Notice: Subject to any disclaimer, the term of this patent is extended or adjusted under 35 U.S.C. 154(b) by 216 days.

(21) Appl. No.: 09/703,472

(22) Filed: Oct. 31, 2000

Related U.S. Application Data

(60) Provisional application No. 60/233,571, filed on Sep. 19, 2000.

(51) Int. Cl.[7] .................................................. G01N 1/00

(52) U.S. Cl. .................................................. 73/864.13

(58) Field of Search .......................... 73/863.32, 864.13, 73/864.14, 864.15, 864.16, 864.17

(56) References Cited

U.S. PATENT DOCUMENTS 3,732,734 A * 5/1973 Avakian .................. 73/864.14
4,072,330 A * 2/1978 Brysch .................... 73/864.14
4,084,730 A * 4/1978 Franke et al. ............ 73/864.14
5,057,281 A * 10/1991 Torti et al. ............... 73/864.14
5,063,790 A 11/1991 Freeman et al. ......... 73/864.14
5,226,462 A 7/1993 Carl .............................. 141/1
5,497,670 A 3/1996 Carl ........................ 73/863.32
5,725,831 A 3/1998 Reichler et al. .............. 422/56

* cited by examiner

*Primary Examiner*—Robert Raevis
(74) *Attorney, Agent, or Firm*—Bingham McCutchen, LLP; David G. Beck

(57) ABSTRACT

A pipette nozzle that achieves a consistently high quality seal between the nozzle and the interior surface of a replaceable pipette tip is provided. In one aspect, the end portion of the nozzle is tapered. The tapered nozzle aids pipette tip engagement in an automated system by relaxing the tolerance on the co-location of the pipette tip and the syringe nozzle. Additionally, the tapered end portion promotes tip sealing. In another aspect of the invention, a small ridge is located on the tapered portion of the nozzle. The ridge forms a seal with the interior surface of the pipette tip. The ridge, in combination with the tapered portions of the nozzle located on either side of the ridge, create three separate interface regions.

13 Claims, 2 Drawing Sheets

PIPETTE TIP HOLDER

CROSS-REFERENCES TO RELATED APPLICATIONS

This application claims priority of provisional patent application Serial No. 60/233,571 filed Sep. 19, 2000, the disclosure of which is incorporated herein by reference for all purposes.

FIELD OF THE INVENTION

The present invention relates generally to liquid pipetting systems and, more particularly, to a method and apparatus for coupling a replaceable pipette tip to a syringe nozzle of such a liquid pipetting system.

BACKGROUND OF THE INVENTION

A pipetting syringe typically utilizes replaceable pipette tips, thereby providing a means for preventing contamination by allowing the user to switch pipette tips prior to using the syringe with a different fluid. Replaceable pipette tips, however, place several demands on both the tip and the syringe nozzle. First, the pipette tips must be easily replaced, thus promoting rapid tip exchange and efficiency of use. Second, a good seal must be formed between the inner surface of the pipette tip and the outer surface of the syringe nozzle. If a good seal is not formed, the quantity of fluid withdrawn or expelled by the syringe may be different from the intended quantity. Third, the seal quality must be consistent in order to insure run to run accuracy.

Replaceable pipette tips are either manually or automatically forced onto the syringe nozzles. Although manual attachment allows the user to monitor tip seal quality, inconsistencies in the amount of force used to couple the tip, hasty or careless tip application, and differences between users, can lead to experimental errors. Additionally, manual attachment is a relatively slow technique and therefore is too inefficient for many applications. Accordingly, automated tip replacement is preferred for those applications utilizing multi-well plates or other mass testing means as this technique allows tips to be replaced quickly. Unfortunately this technique is prone to seal errors. This sealing problem is exacerbated by the difficulties associated with monitoring tip seal quality, especially when a large number of pipettes are in close proximity to one another as is typically the case with a multi-well pipetting system.

Accordingly, what is needed in the art is a pipette tip and syringe assembly that consistently achieves a good tip seal and which can be used in an automated system. The present invention provides such an assembly.

SUMMARY OF THE INVENTION

The present invention provides a pipette nozzle that achieves a consistently high quality seal between the nozzle and the interior surface of a replaceable pipette tip. In one aspect, the end portion of the nozzle is tapered. The tapered nozzle aids pipette tip engagement in an automated system by relaxing the tolerance on the co-location of the pipette tip and the syringe nozzle. Additionally, the tapered end portion promotes tip sealing. In another aspect of the invention, a small ridge is located on the tapered portion of the nozzle. The ridge forms a seal with the interior surface of the pipette tip. The ridge, in combination with the tapered portions of the nozzle located on either side of the ridge, create three separate interface regions.

A further understanding of the nature and advantages of the present invention may be realized by reference to the remaining portions of the specification and the drawings.

DESCRIPTION OF THE SPECIFIC EMBODIMENTS

Figure 1:
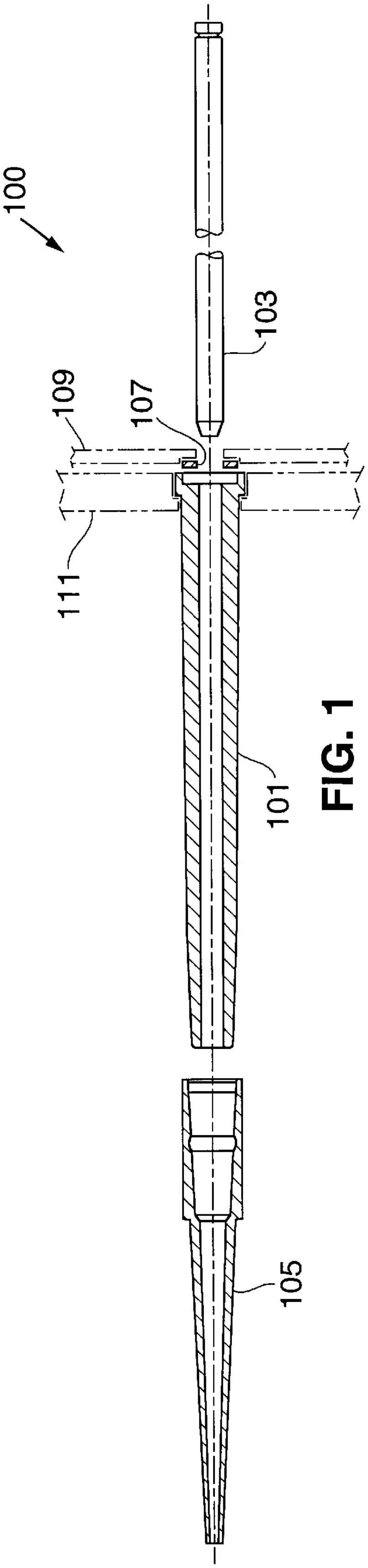
FIG. 1 is a schematic illustration of a pipette assembly.

FIG. 1 is a schematic illustration of a pipette assembly 100 comprised of a syringe nozzle 101, plunger 103, and replaceable pipette tip 105. In use, plunger 103 fits within syringe nozzle 101 while tip 105 attaches to an end portion of syringe nozzle 101. It will be understood by those familiar with the art, that a suitable seal must be formed between plunger 103 and syringe nozzle 101 in order for pipette assembly 100 to successfully aspirate a sample. In the assembly shown, a seal (e.g., o-ring) 107 seals plunger 103 to syringe nozzle 101. Preferably seal 107 is compressed when syringe nozzle 101 is placed within a syringe mounting block, not shown, or other mounting means (e.g., members 109 and 111 shown in phantom). It will also be understood by those familiar with the art, that for pipette assembly 100 to operate properly, a suitable seal must also be formed between the outer surface of syringe nozzle 101 and the inner surface of pipette tip 105.

Figure 2:
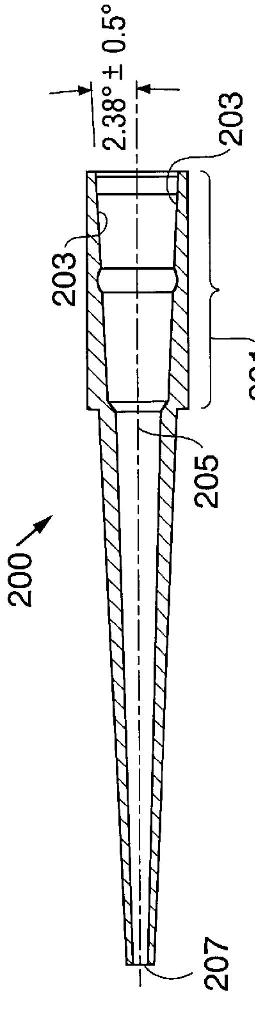
FIG. 2 is a schematic illustration of a pipette tip suitable for use with the invention.

FIG. 2 is a detailed schematic of a pipette tip 200 suitable for use with the invention. Preferably pipette tip 200 is fabricated from polypropylene, although those of skill in the art will recognize that tip 200 can be fabricated from other materials. Portion 201 is designed to accommodate a syringe nozzle and is approximately 10 millimeters long. The diameter of the entrance aperture of portion 201 is approximately 3.5 millimeters. The interior walls 203 of portion 201 are at an angle of approximately 2.4 degrees as measured from the centerline 205. The total length of pipette tip 201 is approximately 33 millimeters and has an internal diameter at the exit aperture of approximately 0.5 millimeters.

Figure 3:
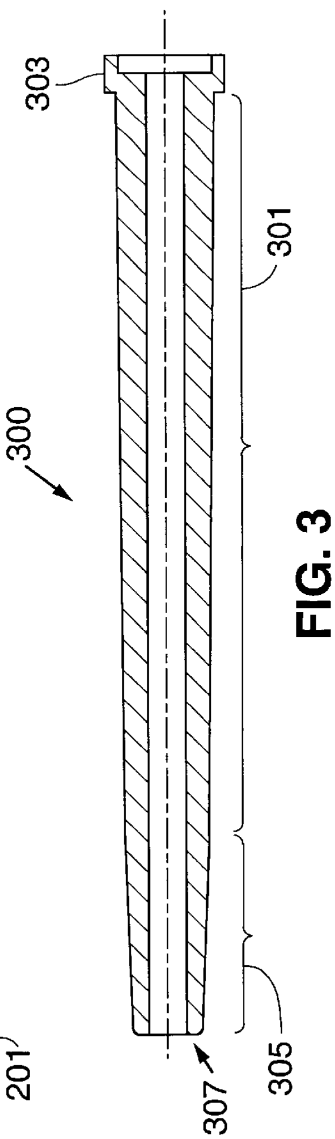
FIG. 3 is a schematic illustration of a syringe nozzle suitable for use with the invention.

FIG. 3 is a detailed schematic of a syringe nozzle 300 in accordance with the preferred embodiment of the invention. It is understood that the dimensions of syringe nozzle 300 are driven by those of pipette tip 200 and therefore can be varied for different size pipette tips without departing from the invention. As shown, syringe nozzle 300 is comprised of a substantially cylindrical portion 301, an upper flange portion 303, and a tapered portion 305. Tapered portion 305 performs two functions. First, the taper improves the ability of syringe nozzle 300 to seal with the interior surface of portion 201 of tip 200. Second, the taper helps to locate or otherwise position tip 307 of syringe nozzle 300 into the entrance aperture of pipette tip 200, an especially important feature for automatic pipetting systems. In the preferred embodiment of the invention, the outer diameter of tip 307 is approximately 90 percent of the inner diameter of the entrance aperture of tip 200.

Figure 4:
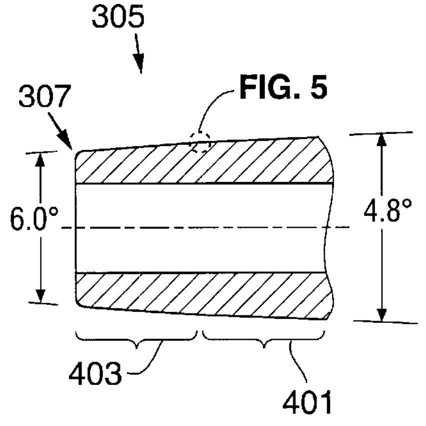
FIG. 4 is a detailed illustration of a portion of the syringe nozzle shown in FIG. 3.
Figure 5:
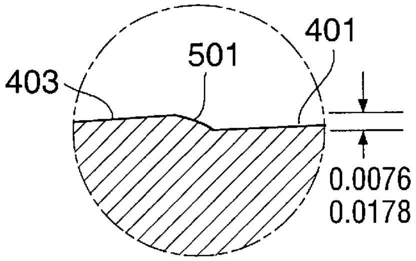
FIG. 5 is a detailed illustration of the ridge structure shown in FIG. 4.

In the preferred embodiment of the invention, syringe nozzle 300 is fabricated from nickel plated aluminum. The outer diameter of cylindrical portion 301 is 3.6 millimeters. As shown in detail in FIGS. 4 and 5, tapered nozzle portion

305 is comprised of two segments 401 and 403. The taper of segment 401 is designed to be approximately equivalent to that of pipette tip inner surfaces 203, i.e., approximately 2.4 degrees off the centerline. Segment 403 has a slightly greater taper, i.e., approximately 3 degrees off the centerline. As shown in greater detail in FIG. 5, interposed between segments 401 and 403 is a small annular ridge structure 501. Preferably ridge structure 501 has a radius of curvature of approximately 0.25 millimeters, extends between 0.0076 and 0.0178 millimeters away from the body of the nozzle as shown, and is located approximately 2.8 millimeters from tip end portion 307.

Figure 6:
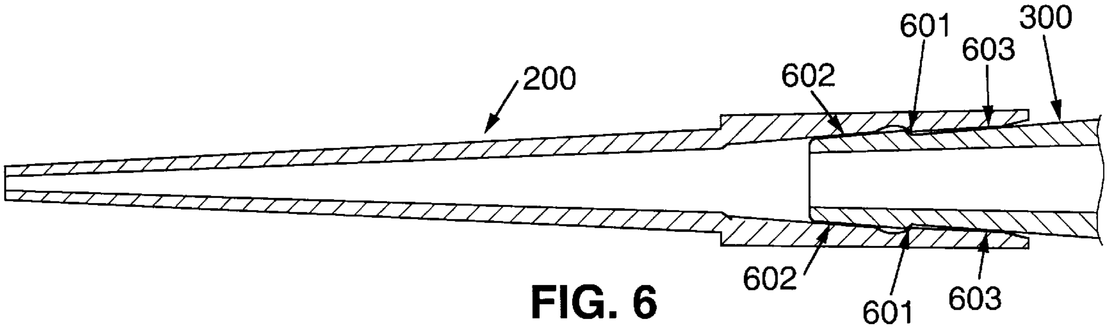
FIG. 6 illustrates the pipette tip to syringe nozzle sealing regions.

FIG. 6 illustrates the pipette tip to syringe nozzle interface regions that result from the syringe nozzle design of the present invention. First, a primary seal 601 is formed along the outer perimeter (circumference) of annular ridge 501. Second, an interface 602 is formed at or near tip portion 307. Third, a wide interface region 603 is formed approximately 1 millimeter from the end of tip 200, the width of interface region 603 being approximately 1.2 millimeters. Interface region 603, typically in combination with interface 602, contributes to the vertical stability of the pipette tip, thus improving pipette tip positioning accuracy. In addition to seal 601, interface 602 and/or interface region 603 may provide additional sealing regions.

The formation of three different interface regions, i.e., 601–603, is due to the inclusion of annular ridge 501 on syringe nozzle 300. In addition to causing the formation of seal 601, ridge 501 in combination with tapered portions 401 and 403 cause the formation of interface regions 603 and 602, respectively. The extended width of interface region 603 is due to the taper of portion 401 being approximately equivalent to the taper of internal tip surfaces 203.

Figure 7:
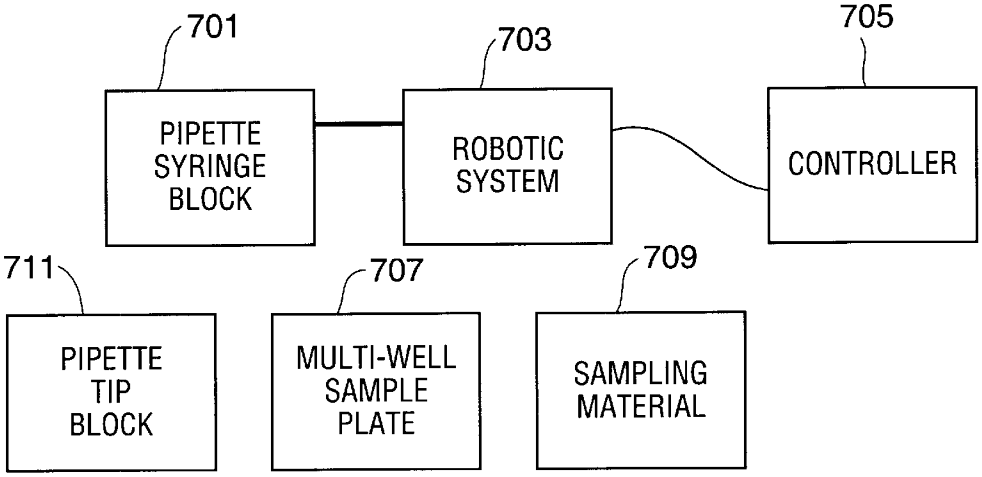
FIG. 7 is a block diagram illustrating the present invention used within an automated system.

It is understood that the specific design of the preferred embodiment shown in FIGS. 2–6 as well as the corresponding dimensions are meant to be illustrative, not limiting, of the present invention. For example, the present invention can be used with syringe nozzle/pipette tips of different sizes than those shown or fabricated from materials different from those described. Additionally, it is understood that the invention can be used in automated systems, as illustrated in FIG. 7, comprised of a syringe block 701 coupled to a robotic system 703 and controller 705. As known by those of skill in the art, such systems utilize multi-well sample plates 707, a variety of sampling materials 709, and replaceable pipette tip contained with tip blocks 711 to provide rapid and simultaneous processing of multiple experiments.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

What is claimed is:

1. A pipette tip sealing apparatus for use with a removable pipette tip, the pipette tip sealing apparatus comprising:
   - a syringe cylindrical portion; and
   - a syringe nozzle portion, said syringe nozzle portion further comprising:
     - an integral annular ridge, wherein a first portion of an inner surface of said removable pipette tip forms a first seal with said integral annular ridge;
     - a first tapered segment adjacent to a first side of said integral annular ridge, wherein a second portion of said inner surface of said removable pipette tip forms a second seal with said first tapered segment; and
     - a second tapered segment adjacent to a second side of said integral annular ridge, wherein a third portion of said inner surface of said removable pipette tip forms a third seal with said second tapered segment.

2. The pipette tip sealing apparatus of claim 1, wherein a first taper corresponding to said first tapered segment is substantially equivalent to a second taper corresponding to said second tapered segment.

3. The pipette tip sealing apparatus of claim 1, wherein a first taper corresponding to said first tapered segment is greater than a second taper corresponding to said second tapered segment.

4. The pipette tip sealing apparatus of claim 3, wherein said first taper is approximately 3 degrees as measured from a centerline of said syringe nozzle portion.

5. The pipette tip sealing apparatus of claim 3, wherein said second taper is approximately 2.4 degrees as measured from a centerline of said syringe nozzle portion.

6. The pipette tip sealing apparatus of claim 1, wherein said integral annular ridge is located approximately 2.8 millimeters from an end portion of said syringe nozzle portion.

7. A pipette tip sealing apparatus comprising:
   - a pipetting syringe holding block;
   - a plurality of syringes coupled to said pipetting syringe holding block, wherein each of said plurality of syringes further comprises:
     - a syringe cylindrical portion; and
     - a syringe nozzle portion, said syringe nozzle portion further comprising:
       - an integral annular ridge, wherein a first portion of an inner surface of a corresponding removable pipette tip forms a first seal with said integral annular ridge; and
       - a first tapered segment adjacent to a first side of said integral annular ridge, wherein a second portion of said inner surface of said removable pipette tip forms a second seal with said first tapered segment; and
       - a second tapered segment adjacent to a second side of said integral annular ridge, wherein a third portion of said inner surface of said removable pipette tip forms a third seal with said second tapered segment; and
       - a robotic system mechanically coupled to said pipetting syringe holding block, said robotic system moving said pipetting syringe holding block between at least a first and a second position, wherein said first position is a pipette tip mounting position and said second position is a pipetting position.

8. The pipette tip sealing apparatus of claim 7, further comprising a pipette tip holding block and a plurality of removable pipette tips coupled to said pipette tip holding block.

9. The pipette tip sealing apparatus of claim 7, wherein a first taper corresponding to said first tapered segment is substantially equivalent to a second taper corresponding to said second tapered segment.

10. The pipette tip sealing apparatus of claim 7, wherein a first taper corresponding to said first tapered segment is greater than a second taper corresponding to said second tapered segment.

11. The pipette tip sealing apparatus of claim 10, wherein said first taper is approximately 3 degrees as measured from a centerline of said syringe nozzle portion.

12. The pipette tip sealing apparatus of claim 10, wherein said second taper is approximately 2.4 degrees as measured from a centerline of said syringe nozzle portion.

13. The pipette tip sealing apparatus of claim 7, wherein said integral annular ridge is located approximately 2.8 millimeters from an end portion of said syringe nozzle portion.

* * * * *